United States Patent [19]

Kinoshita et al.

[11] Patent Number: 5,750,287
[45] Date of Patent: May 12, 1998

[54] ORGANIC ELECTROLYTIC CELL

[75] Inventors: Hajime Kinoshita; Nobuo Ando; Akihiro Anekawa; Takeshi Hashimoto; Yukinori Hato, all of Osaka; Shizukuni Yata, Hyogo, all of Japan

[73] Assignee: Kanebo Ltd., Tokyo, Japan

[21] Appl. No.: 619,489

[22] PCT Filed: Sep. 22, 1994

[86] PCT No.: PCT/JP94/01557

§ 371 Date: Mar. 21, 1996

§ 102(e) Date: Mar. 21, 1996

[87] PCT Pub. No.: WO95/08852

PCT Pub. Date: Mar. 30, 1995

[30] Foreign Application Priority Data

Sep. 22, 1993  [JP]  Japan ............... 5-259403

[51] Int. Cl.[6] .................... H01M 10/40; H01M 4/02
[52] U.S. Cl. .................... 429/218; 429/194; 429/217
[58] Field of Search ............... 429/218, 194, 429/217

[56] References Cited

U.S. PATENT DOCUMENTS 4,601,849  7/1986  Yata ................. 252/500
4,615,960  10/1986  Yata ................. 429/194

FOREIGN PATENT DOCUMENTS 3252065  11/1991  Japan.

*Primary Examiner*—John S. Maples
*Attorney, Agent, or Firm*—Flynn, Thiel, Boutell & Tanis, P.C.

[57] ABSTRACT

There is provided an organic electrolytic cell equipped with a positive electrode, a negative electrode and a solution of a lithium salt in an aprotic organic solvent as an electrolytic solution, wherein (1) the positive electrode contains a metallic oxide,
(2) the negative electrode is an infusible, insoluble substrate (PAS) having a polyacene type skeletal structure and a hydrogen/carbon atomic ratio of 0.5 to 0.05, the substrate being a heat-treated product of an aromatic condensation polymer, and
(3) the total amount of lithium contained in the cell is 500 mAh/g or more, and the amount of lithium originating in the negative electrode is 100 mAh/g or more, based on the infusible, insoluble substrate (PAS) having a polyacene type skeletal structure as the negative electrode, the organic electrolytic cell being a secondary cell having a high capacity and high voltage.

13 Claims, 2 Drawing Sheets

ORGANIC ELECTROLYTIC CELL

BACKGROUND OF THE INVENTION

The present invention relates to an organic electrolytic cell having a high capacity and high voltage, wherein an infusible, insoluble substrate having a polyacene type skeletal structure is used as the negative electrode, and a metallic oxide is used as the positive electrode.

In recent years, a secondary cell wherein an electrically conductive macromolecule, an oxide of a transition metal or the like is used as the positive electrode, and metallic lithium or a lithium alloy is used as the negative electrode has been proposed as a cell to be used in place of Ni-Cd storage cells and lead storage cells, because of its high energy density.

However, when such a secondary cell is subjected to repeated charge and discharge, its capacity is largely lowered due to deterioration of the positive electrode or negative electrode, and thus there still remains a problem in its practical aspect. Particularly by deterioration of the negative electrode, mossy lithium, called dendrites, are formed, and through repeated charge and discharge, the dendrites finally penetrates the separator and causes a short circuit, and in some case the cell is ruptured, and thus there has been a problem in its safety, too.

Recently, for solving the above problems, there has been proposed a cell wherein a carbonic material, such as graphite, is used as the negative electrode, and a lithium-containing metallic oxide, such as $LiCoO_2$, is used as the positive electrode. The cell is a so-called rocking chair-type cell wherein after assembly of the cell, lithium is supplied from the lithium-containing metallic oxide as the positive electrode to the negative electrode through charge, and lithium of the negative electrode is returned to the positive electrode through discharge. Although the cell is characterized by a high voltage and high capacity, its capacity is at most on the order of 80 to 90 mAh/cc (based on the total volumes of the electrodes; the separator and the current collectors); the high energy density which is a characteristic of lithium cells has not been obtained.

On the other hand, an infusible, insoluble substrate having a polyacene type skeletal structure and having a hydrogen/carbon atomic ratio of 0.5 to 0.05, which is a heat-treated product of an aromatic condensation polymer, can be doped with a larger amount of lithium, compared with general carbonic materials. However, when a cell was assembled using the infusible, insoluble substrate, its capacity was not adequately satisfactory.

SUMMARY OF THE INVENTION

Thus, the first object of the present invention lies in providing a secondary cell having a high capacity and high voltage.

Another object of the invention lies in providing such a secondary cell that charge and discharge are possible over a long term and is excellent in safety.

Still another object of the invention lies in providing a secondary cell which is easy to prepare.

Still another object of the invention will be apparent from the following description.

DETAILED DESCRIPTION OF THE INVENTION

The present inventors found that for attaining the above objects and advantages, it is important to use a metallic oxide as the positive electrode and an infusible, insoluble substrate having a polyacene type skeletal structure as the negative electrode, and control the amount of lithium in the cell appropriately.

More detailedly, it was found that the above objects and advantages can be accomplished by an organic electrolytic cell equipped with a positive electrode, a negative electrode and a solution of a lithium salt in an aprotic organic solvent as an electrolytic solution, wherein (1) the positive electrode is one containing a metallic oxide, (2) the negative electrode is an infusible, insoluble substrate having a polyacene type skeletal structure and a hydrogen/carbon atomic ratio of 0.5 to 0.05, said substrate being a heat-treated product of an aromatic condensation polymer (hereinafter referred to as PAS), and (3) the total amount of lithium contained in the cell is 500 mAh/g or more, and the amount of lithium originating in the negative electrode is 100 mAh/g or more, based on the negative electrode PAS.

The aromatic condensation polymer in the invention is a condensate of an aromatic hydrocarbon compound with an aldehyde. As the aromatic hydrocarbon compound, so-called phenols such as, for example, phenol, cresol and xylenol are preferred. It can, for example, be a methylene-bisphenol represented by the following formula (A)

wherein x and y are independently 0, 1 or 2, or it can also be a hydroxy-biphenyl or a hydroxy-naphthalene. Among them, phenols, particularly phenol are preferred in a practical aspect.

As the aromatic condensation polymer in the invention, there can also be used a modified aromatic condensation polymer wherein part of the aromatic hydrocarbon compound having phenolic hydroxyl group(s) was replaced with an aromatic hydrocarbon compound having no phenolic hydroxyl group such as, for example, xylene, toluene or aniline, for example, a condensate of phenol, xylene and formaldehyde, and further, there can also be used a modified aromatic polymer wherein the above part is replaced with melamine or urea. Further, furan resins are also preferred.

Further, as the aldehyde, it is possible to use aldehydes such as formaldehyde, acetaldehyde and furfural, but formaldehyde is preferred. A phenolformaldehyde condensate can be any of a novolak type, a resol type and a mixture thereof.

The infusible, insoluble substrate in the invention can be obtained by heat treating the above aromatic polymer, and there can be used all of the infusible, insoluble substrates having a polyacene type skeletal structure described in Japanese Patent Publication No. 44212/1989 (U.S. Pat. No. 4,601,849, EP 67444), Japanese Patent Publication No. 24024/1991 (U.S. Pat. No. 4,615,960, EP 149497), etc., and such an infusible, insoluble substrate can also be prepared as follows.

An infusible, insoluble substrate having a hydrogen/carbon atomic ratio (hereinafter referred to as H/C) of 0.50 to 0.05, preferably 0.35 to 0.10 can be obtained by gradually heating the aromatic condensation polymer up to a proper temperature of 400° C. to 800° C. in a non-oxidizing atmosphere (including a vacuum) such as nitrogen or argon.

It is also possible to obtain an infusible, insoluble substrate having a specific surface area, measured by the BET method, of 600 m$^2$/g or more according to the method described in Japanese Patent Publication No. 24024/1991 (U.S. Pat. No. 4,615,960, EP 149497), or the like. For example, an infusible, insoluble substrate having the above H/C and having a specific surface area, measured by the BET method, of, e.g., 600 m$^2$/g or more can also be obtained, for example, by preparing a solution containing an initial condensate of an aromatic condensation polymer and an inorganic salt such as zinc chloride; heating the solution to cure it in a mold; gradually heating the cured matter, in a non-oxidizing atmosphere (including a vacuum), up to a temperature of 350° C. to 800° C., preferably up to a proper temperature of 400° C. to 750° C.; and then sufficiently washing it with water, diluted hydrochloric acid or the like.

As to an infusible, insoluble substrate used in the invention, according to X-ray diffraction (CuKα), the main peak is observed at 2θ=24° or less, and besides the main peak, another peak is observed between 2θ=41° and 2θ=46°.

Namely, it is suggested that the infusible, insoluble substrate has a polyacene type skeletal structure wherein an aromatic polycyclic structure was moderately developed, and takes an amorphous structure, and thus the substrate can be doped stably with lithium, and therefore, is useful as an active material for cells.

When H/C is above 0.50, the aromatic polycyclic structure does not sufficiently develop, and thus it is impossible to conduct doping and undoping of lithium smoothly, and when a cell is assembled, charge and discharge efficiency is lowered. On the other hand, when H/C is less than 0.05, the capacity of the cell of the invention is lowered, which is undesirable.

The negative electrode of the invention is composed of the infusible, insoluble substrate (hereinafter referred to as PAS), and practically, it is desirable to use a form obtained by forming PAS in an easily formable form such as a powdery form, a granular form or a short fiber form with a binder.

As the binder, a fluorine binder is preferred, and a fluorine binder having a fluorine/carbon atomic ratio (hereinafter referred to as F/C) of under 1.5 but 0.75 or more is further preferred, and a fluorine-containing polymer binder having a F/C atomic ratio of under 1.3 but 0.75 or more is particularly preferred.

As the fluorine binder, there can, for example, be mentioned polyvinylidene fluoride, a vinylidene fluoride-ethylene trifluoride copolymer, an ethylene-ethylene tetrafluoride copolymer, a propylene-ethylene tetrafluoride copolymer, etc., and further, it is also possible to use a fluorine-containing polymer wherein hydrogens at the principal chain are replaced with alkyl groups. In the case of poly-vinylidene fluoride, F/C is 1, and in the case of the vinylidene fluoride-ethylene trifluoride copolymer, when the molar fractions of vinylidene fluoride are 50% and 80%, F/C values become 1.25 and 1.1, respectively, and in the case of the propylene-ethylene tetrafluoride copolymer, when the molar fraction of propylene is 50%, F/C becomes 0.75. Among them, polyvinylidene fluoride, and a vinylidene fluoride-ethylene trifluoride copolymer wherein the molar fraction of vinylidene fluoride is 50% or more are preferred, and practically, polyvinylidene fluoride is preferred.

When these binders are used, it is possible to adequately utilize the doping ability (capacity) with lithium which PAS has.

As the positive electrode of the organic electrolytic cell of the invention, there can, for example, be used lithium-containing metallic oxides capable of electrochemical doping with lithium and electrochemical undoping of lithium, which can be represented by the general formula Li$_x$M$_y$O$_z$ (M is a metal capable of taking plural valences, and can be two or more metals) such as Li$_x$CoO$_2$, Li$_x$NiO$_2$, Li$_x$MnO$_2$ or Li$_x$FeO$_2$, or oxides of transition metals such as cobalt, manganese and nickel. Particularly, a lithium-containing oxide having a voltage of 4V or more vs Li/Li$^+$ is preferred. Among them, lithium-containing cobalt oxides and lithium-containing nickel oxides are preferred.

The positive electrode in the invention is one made by forming the metallic oxide, if necessary, in addition with an electrically conductive material and a binder, and the kinds, compositions, etc. of the electrically conductive material and binder can suitably be specified.

As to the kind of the electrically conductive material, it can be a powder of a metal, such as metallic nickel, but particularly preferred are carbonic materials such as, for example, active carbon, carbon black, acetylene black and graphite. Its mixing ratio is varied depending on the electric conductivity of the active substance, the shape of the electrode, etc., but it is suitable to add it in an amount of 2 to 40% based on the active substance.

Further, as to the kind of the binder, any binder can be used so long as it is insoluble in the later-described electrolytic solution which is used in the invention, and there can, for example, preferably be used rubber binders such as SBR, fluorine-containing resins such as polyethylene tetrafluoride and polyvinylidene fluoride, and thermoplastic resins such as polypropylene and polyethylene, and its mixing ratio is preferably 20% or less.

The positive electrode and negative electrode used in the invention can take various shapes, for example, plate-like, film-like and cylindrical shapes, and a such that the electrode is formed on metallic foil. Particularly, an electrode obtained by forming the positive electrode or the negative electrode on metallic foil so as to be film-like of plate-like is preferred because such an electrode can be applied to various cells as an electrode which is formed on a current collector.

In the cell of the invention, it is possible to increase its capacity greatly, compared with usual cells, by using the PAS as the negative electrode and appropriately controlling the amount of lithium contained in the cell.

In the invention, the total amount of lithium contained in the cell is the total of the lithium originating in the positive electrode, lithium originating in the electrolytic solution, and lithium originating in the negative electrode.

Lithium originating in the positive electrode is lithium contained in the positive electrode at the time of assembly of the cell, and part or all of the lithium is supplied to the negative electrode by an operation (charge or the like) of sending a current from an outer circuit. Lithium originating in the electrolytic solution is lithium in the electrolytic solution contained in the separator, the positive electrode, the negative electrode, etc. Further, lithium originating in the negative electrode is lithium carried on the negative electrode PAS of the invention (lithium other than lithium originating in the positive electrode and lithium originating in the electrolytic solution).

A method for carrying lithium on the negative electrode PAS is not particularly limited, and there can, for example, be mentioned a method which comprises previously doping, before assembly of a cell, the negative electrode PAS with lithium in an electrochemical cell wherein metallic lithium is used as a counter electrode, and then assembling a the cell; a method which comprises making electric current conduct between the negative electrode PAS and metallic lithium in a cell by a method, e.g. of laminating metallic lithium on the negative electrode PAS, and then doping PAS with lithium in the cell; etc.

The total amount of lithium in the cell in the invention is 500 mAh/g or more, preferably 600 mAh/g or more based on the negative electrode PAS, and in the case of under 500 mAh/g, adequate capacity cannot be obtained.

Further, the amount of lithium originating in the negative electrode is 100 mAh/g or more, preferably 150 mAh/g or more based on the negative electrode PAS, and in the case of under 100 mAh/g, adequate capacity cannot be obtained, even if the total amount of lithium is 500 mAh/g or more based on the negative electrode PAS.

Although as to the amount of lithium originating in the positive electrode and the amount of lithium originating in the electrolytic solution, it is sufficient if the above conditions are satisfied, it is preferred that the amount of lithium originating in the positive electrode is 300 mAh/g or more based on the negative electrode PAS, namely that the amount of lithium originating in the positive electrode is 300 mAh or more per g of the negative electrode PAS.

Further, when a lithium-containing oxide is used as the positive electrode, it is advantageous to make the amount of lithium originating in the negative electrode 600 mAh/g or less based on the negative electrode PAS.

As the solvent constituting the electrolytic solution of the invention, an aprotic organic solvent is used. As the aprotic organic solvent, there can, for example, be mentioned ethylene carbonate, propylene carbonate, dimethyl carbonate, diethyl carbonate, γ-butyrolactone, acetonitrile, dimethoxyethane, tetrahydrofuran, dioxolane, methylene chloride, sulfolane, etc. and a mixed solvent of two or more of these aprotic organic solvents can also be used.

Further, as an electrolyte to be dissolved in the mixed or single solvent, any of electrolyte capable of forming lithium ions can be used. As the electrolyte, there can, for example, be mentioned LiI, LiClO$_4$, LiAsF$_6$, LiBF$_4$, LiPF$_6$, LiHF$_2$, etc.

The electrolyte and the solvent are mixed in a state of sufficient dehydration to give an electrolytic solution, and for making the internal resistance by the electrolytic solution small, it is preferred to make the concentration of the electrolyte in the electrolytic solution at least 0.1 mole/liter or more, and usually, it is further preferred to make it 0.2 to 1.5 moles/liter.

As the current collector for taking out current outside the cell, there can, for example, be used carbon, platinum, nickel, stainless steel, aluminum, copper, etc., and when a foil-like or net-like current collector is used, an electrode can be given as an electrode which is formed on a current collector.

Figure 1:
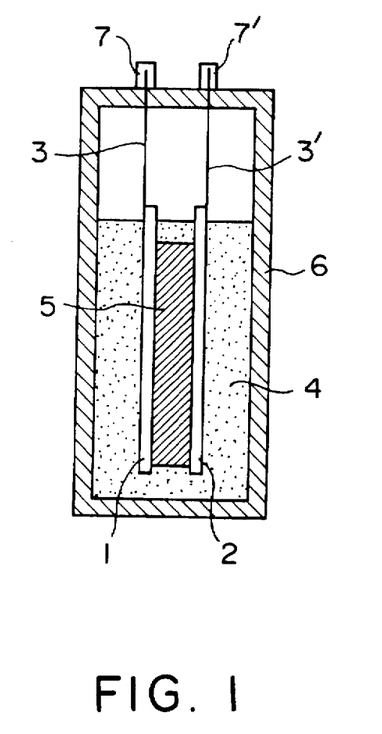
FIG. 1 is a partial sectional view illustrating the structure of a first embodiment of the cell of the invention and FIG. 2 is a cutout view illustrating the structure of a second embodiment of the cell of the invention.

An example of the embodiments of the invention is described below according to a drawing. FIG. 1 is a drawing for describing the basal constitution of the cell according to the invention. In FIG. 1, (1) is a positive electrode, and (2) is a negative electrode. (3) and (3') are current collectors connected to the respective electrodes and respective outside terminals (7) and (7') so that a voltage drop does not arise. (4) is an electrolytic solution, and therein a compound capable of forming ions with which the electrodes can be doped, is dissolved in an aprotic organic solvent. The electrolytic solution is usually liquid, but for preventing leakage of the solution, it an also be used after being made into gel or a solid. (5) is a separator disposed for preventing contact between both positive and negative electrodes and holding the electrolytic solution.

The separator is made of a porous material which is durable against the electrolytic solution, the electrode active substance, etc., has open pores and is electrically non-conductive. It can usually be a cloth, a non-woven cloth, a porous material, or the like, and composed of glass fiber, polyethylene, polypropylene or the like. To decrease the internal resistance of the cell, the separator is preferably as thin as possible. Its thickness, however, is determined by considering the amount of the electrolytic solution held, its permeability, its strength, etc. The positive and negative electrodes and the separator are fixed in position within a cell casing (6) in a manner not to give rise to any problem in use. The shape, size, etc. of the electrodes can properly be determined according to the shape and performance of the desired cell.

The shape of the cell of the invention can be coin-type, cylindrical-type, rectangular-type, box-type, etc., but is not particularly limited.

As described above, as to the characteristics and advantages of the organic electrolytic cell of the invention, the organic electrolytic cell is such a cell that PAS is used as the negative electrode, a metallic oxide is used as the positive electrode, both the amount of lithium in the cell and the amount of lithium originating in the negative electrode PAS are appropriately controlled, and has a high capacity and high voltage.

As described above, the basal characteristic of the organic electrolytic cell of the invention is to control the total amount of lithium contained in the cell to 500 mAh/g or more, and control the amount of lithium originating in the negative electrode to 100 mAh/g or more, but, further, preferred embodiments of the invention are described below.

(1) In the cell of the invention, its capacity can be greatly increased, compared with usual cells, by appropriately controlling the amount of lithium contained in the cell, as described above, and, at the same time, controlling the pore structure of PAS used as the negative electrode so as to be described below.

The amount of nitrogen gas adsorbed on PAS in the invention can be measured as follows. Namely, 0.035 g of PAS fine particles having an average particle size of 15 μm obtained by grinding using a disc mill is put in the sample cell of a volumetric apparatus (made by Yuasa Ionics, Ltd. AutoSorb-1), and nitrogen gas is adsorbed at a liquid nitrogen temperature of 77° K. From the adsorption isotherm obtained, the amount (cc/g) of the gas adsorbed is plotted against the thickness t (Å) of the layer of the gas adsorbed. t (Å) is calculated by the following equation (1).

$$t(\text{Å}) = \left( \frac{13.99}{\log(P/P_0) + 0.034} \right)^{1/2} \quad (1)$$

wherein $P/P_0$ is the relative pressure of nitrogen.

In the invention, it is preferred to control the pore structure of PAS used as the negative electrode so that the amount of the gas adsorbed at the thickness of adsorbed nitrogen of 10 Å found from the above nitrogen adsorption isotherm can be 100 cc/g or less, particularly 80 cc/g or less.

In the invention, when the amount of the gas adsorbed on PAS at the thickness of adsorbed nitrogen of 10 Å is above an adequate capacity cannot be obtained. Further, in the invention, the total amount of lithium in the cell is 500 mAh/g or more, preferably 600 mAh/g or more, based on the negative electrode PAS, and in the case of under 500 mAh/g, an adequate capacity cannot be obtained.

Further, the amount of lithium originating in the negative electrode in the invention is 100 mAh/g or more, preferably 150 mAh/g or more, based on the negative electrode PAS, and in the case of under 100 mAh/g, an adequate capacity cannot be obtained, even if the total lithium amount is 500 mAh/g or more, based on the negative electrode PAS.

Although as to the amount of lithium originating in the positive electrode and the amount of lithium originating in the electrolytic solution, it is sufficient if the above conditions are satisfied, it is preferred that the amount of lithium originating in the positive electrode is 300 mAh/g or more based on the negative electrode PAS.

(2) The second preferred embodiment of the invention is described below.

As already stated, in the invention, it is preferred to use as the negative electrode a form obtained by forming fine particles (e.g., granular, powdery, short fiber, etc.) of an infusible, insoluble substrate (hereinafter referred to as PAS) having a polyacene type skeletal structure and having a hydrogen/carbon atomic ratio of 0.5 to 0.05, said substrate being a heat-treated product of an aromatic condensation polymer, using a binder, preferably a fluorine binder.

Thus, in the invention, it is advantageous that a form of fine particles of the infusible, insoluble substrate (PAS), obtained by forming PAS fine particles in an easy to make form such as a powdery form or a granular form with a binder, is used as the negative electrode, and further that the fine particles PAS has an average particle size of 20 µm or less, and when the 50% size is 2a µm, the amount of particles having a particle size of 1a µm or less is 10% or more by volume ratio, and the amount of particles having a particle size of 4a µm or more is 10% or more by volume ratio, and further, preferably, when the 50% size is 2a µm, the amount of particles having a particle size of 1a µm or less is 20% or more by volume ratio, and the amount of particles having a particle size of 4a µm or more is 10% or more by volume ratio, and particularly preferably, when the 50% size is 2a µm, the amount of particles having a particle size of 1a µm or less is 20% or more by volume ratio, and the amount of particles having a particle size of 4a µm or more is 20% or more by volume ratio. In the invention, it is advantageous, for obtaining a cell having a high capacity, that the fine particles have a wide particle size distribution and an average particle size of not more than 20 µm. When the average particle size is above 20 µm, or even when the average particle size is 20 µm or less, when the 50% size is 2a µm, the amount of particles having a particle size of 1a µm or less is under 10% by volume ratio, or the amount of particles having a particle size of 4a µm or more is under 10% by volume ratio, the capacity of the resultant cell is low, which is undesirable.

In this connection, the average particle size is a volume average particle size, and the 50% size is a particle size corresponding to 50% of an integration curve of particle volume (see the following literature). "Funtai Riron to Oyo" (Fine Particle Theory and Its Application), edited by Kiichiro Kubo and others, pages 450 to 453, published by Maruzen Co., Ltd. on May 12, 1969.

PAS as fine particles can be obtained by grinding an infusible, insoluble substrate obtained by heat treating a form of an aromatic polymer. The method of grinding is not particularly limited, but it is efficient to use a grinder having both grinding mechanisms of impact and friction, for example, a ball mill such as a pot mill or a vibrating mill. Further, in some case, PAS as fine particles can also be obtained by classifying the powder obtained, or by mixing two or more PAS powders having different particle size distributions.

As the binder used in the negative electrode of the invention, a fluorine binder is preferred, as stated already, and further preferred is a fluorine binder having a fluorine/carbon atomic ratio (hereinafter referred to as F/C) of under 1.5 but 0.75 or more, and particularly preferred is a fluorine binder having a F/C of under 1.3 but 0.75 or more.

As the fluorine binder, there can, for example, be mentioned polyvinylidene fluoride, a vinylidene fluoride-ethylene trifluoride copolymer, an ethylene-ethylene tetrafluoride copolymer, a propylene-ethylene tetrafluoride copolymer, etc., and further, it is also possible to use a fluorine-containing polymer wherein hydrogens at the principal chain are replaced with alkyl groups.

The negative electrode of the invention is obtained by forming fine particles of PAS with a binder, as stated already, and the porosity of the negative electrode is determined by impregnating the negative electrode with propylene carbonate at 25° C., and is preferably 40% or less. When the porosity is above 40%, even if the particle size of PAS is controlled as described above, as to cells obtained therefrom, adequate capacity is hard to get.

It is preferred, as stated above, that the porosity of the negative electrode used in the invention is 40% or less, and according to experience of the present inventors, cells of high capacity can be obtained, unexpectedly, even when the porosity of the negative electrode is on the order of 25%. In the light of this fact, it is believed that there is no problem even if the porosity of the negative electrode is on the order of 20%.

(3) The third preferred embodiment of the invention is described below.

As the negative electrode of the organic electrolytic cell of the invention is preferred a negative electrode obtained by forming an infusible, insoluble substrate (PAS) having a polyacene type skeletal structure and a hydrogen/carbon atomic ratio of 0.5 to 0.05, said substrate being a heat-treated product of an aromatic condensation polymer, on metallic foil using a thermoplastic binder, and then heating the resultant form at a temperature equal to or higher than the melting point of the thermoplastic binder.

As stated already, as the thermoplastic binder, preferred are fluorine-containing polymer binders, particularly, a fluorine-containing polymer having a fluorine/carbon atomic ratio of under 1.5 but 0.75 or more, particularly polyvinylidene fluoride.

When such a binder is used, it is possible to sufficiently utilize the ability (capacity) of PAS to be doped with lithium.

When, as to the negative electrode of the invention, the PAS is formed with a binder and the resultant form is heat treated at a temperature equal to or higher than the melting point of the thermoplastic binder, the method of heat treatment is not particularly limited, but it is preferred to conduct the heat treatment in a non-oxidizing atmosphere in the range of from a temperature higher by 5° C. than the melting point to a temperature higher by 100° C. than the melting point. When the heat treatment is not conducted, for example when the negative electrode PAS formed on the metallic foil is doped with lithium in an electrochemical cell wherein metallic lithium is used as a counter electrode, and then a cell is assembled using the doped negative electrode PAS, there arises a phenomena, e.g. that the flexural strength of the electrode is weakened, peeling of the electrode is liable to occur, and further, the internal resistance of the assembled cell increases, and as a result, it becomes difficult to get sufficient capacity.

When, in the invention, an infusible, insoluble substrate (PAS) having a polyacene type skeletal structure is formed on a metallic foil using a thermoplastic binder, preferably a fluorine-containing polymer binder, the forming is conducted, for example by sufficiently mixing the infusible, insoluble substrate, the fluorine-containing polymer, and a solvent or dispersion medium, and then forming the mixture. The amount of the fluorine-containing polymer varies depending on the shape and particle size of the infusible, insoluble substrate, the strength and shape of the desired electrode, etc., but is preferably 2% to 50%, more preferably 5% to 30% by weight based on the infusible, insoluble substrate. As the solvent, preferred are solvents capable of dissolving the fluorine-containing polymer such as N,N-dimethylformamide, N-methylpyrrolidone and N,N-dimethylacetamide. In the above mixture, it does not become a particular problem whether the fluorine-containing polymer is completely dissolved, or only part thereof is dissolved, but it is preferred for obtaining a homogeneous electrode that the fluorine-containing polymer is completely dissolved. Further, the viscosity of the mixture can be controlled by the amount of the solvent, and for example, it is possible to form the mixture adjusted to a high viscosity into a sheet using a roller or the like, and it is also possible to obtain an extremely thin electrode having a thickness, e.g. of 100 μm or less by applying a mixed slurry adjusted to a low viscosity onto metallic foil, drying it and if necessary, pressing it. Particularly, when an excellent flexibility is desired, an application forming method is desirable.

The positive electrode and negative electrode used in the invention can take various shapes, for example, plate-like, film-like and cylindrical shapes, and a shape such that the electrode is formed on metallic foil. Particularly, an electrode obtained by forming the positive electrode or the negative electrode on metallic foil is preferred because such an electrode can be applied to various cells as an electrode which is formed on a current collector.

(4) The fourth preferred embodiment of the invention is described below.

Further, in the organic electrolytic cell of the invention, it is preferred wherein i) the negative electrode is an infusible, insoluble substrate (PAS) having a polyacene type skeletal structure and a hydrogen/carbon atomic ratio of 0.5 to 0.05, said substrate being a heat-treated product of an aromatic condensation polymer, ii) the total amount of lithium contained in the cell is 500 mAh/g or more, and the amount of lithium originating in the negative electrode is 100 mAh/g or more, based on the negative electrode PAS, and iii) lithium originating in the negative electrode is previously carried on PAS before assembly of the cell.

Lithium originating in the negative electrode in the invention is lithium carried on the negative electrode PAS of the invention (lithium other than lithium originating in the positive electrode and lithium originating in the electrolytic solution).

In the above preferred embodiment of the invention, a method for carrying lithium on the negative electrode PAS is not particularly limited so long as it is possible by the method to carry lithium on the negative electrode PAS before assembly of the cell. For example, it is possible to previously carry lithium on the negative electrode PAS by passing a constant current or applying a constant voltage in an electrochemical cell wherein metallic lithium is used as a counter electrode. When lithium is carried on the negative electrode PAS after assembly of the cell, for example, when a method is taken which comprises making current conduct between the negative electrode PAS and metallic lithium in a cell by a method, e.g. of laminating metallic lithium on the negative electrode PAS, and then doping PAS with lithium in the cell, not only is the capacity as a practical cell lowered, but, e.g., the internal resistance of the cell increases, which is undesirable.

Even in this case, it is advantageous that the total amount of lithium contained in the cell is 500 mAh/g or more, preferably 600 mAh/g or more, based on the negative electrode PAS, and in the case of under 500 mAh/g, sufficient capacity cannot be obtained.

Further, the amount of lithium originating in the negative electrode in the invention is 100 mAh/g or more, preferably 150 mAh/g or more, based on the negative electrode PAS, and in the case of under 100 mAh/g, adequate capacity cannot be obtained, even if the total lithium amount is 500 mAh/g or more based on the negative electrode PAS. Further, when a lithium-containing oxide is used in the positive electrode, it is practical to make the amount of lithium originating in the negative electrode 600 mAh/g or less based on the negative electrode PAS, as stated already.

Although as to the amount of lithium originating in the positive electrode and the amount of lithium originating in the electrolytic solution, it is sufficient if the above conditions are satisfied, and it is preferred that the amount of lithium originating in the positive electrode is 300 mAh/g or more based on the negative electrode PAS.

Figure 2:
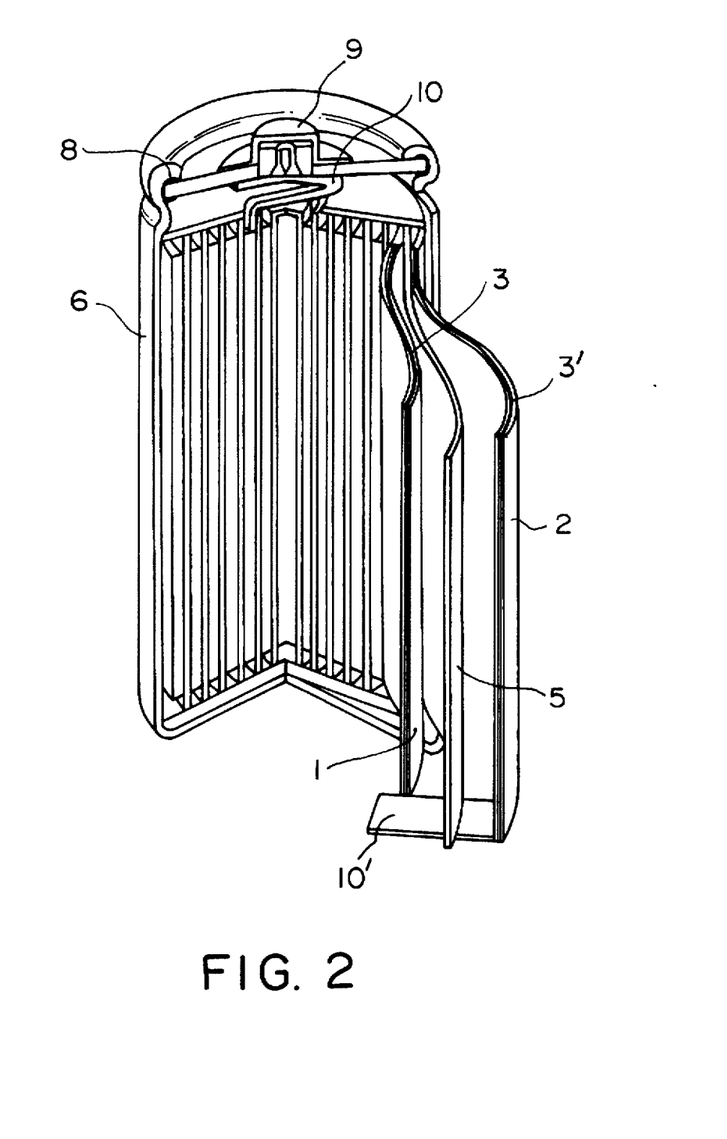

An example of still other embodiments of the invention is described below according to a drawing. FIG. 2 is a drawing for describing the basal constitution of the cell according to the invention. In FIG. 2, (1) is a positive electrode, and (2) is a negative electrode. (3) and (3') are current collectors, and each electrode is formed on each current collector. Lead terminals (10) and (10') are connected to the respective current collectors so that a voltage drop does not arise, and the other ends are connected to a cell casing (6) and a top cap (9). (5) is a separator impregnated with an electrolytic solution, and in the electrolytic solution, the aforesaid compound capable of forming ions with which doping is made is dissolved in an aprotic organic solvent. The electrolytic solution is usually a liquid, and impregnated into the separator, but it can also be used, without any separator, after being made into gel or a solid for preventing leakage of the solution. (8) is an insulating packing for preventing contact between both positive and negative electrodes (the cell casing and the top cap).

The separator is made of a porous material which is durable against the electrolytic solution, the electrode active substance, etc., has open pores and is electrically non-conductive. It can usually be a cloth, a non-woven cloth, a porous material, or the like and is composed of glass fiber, polyethylene, polypropylene or the like. To decrease the internal resistance of the cell, the separator is preferably as thin as possible. Its thickness, however, is determined by considering the amount of the electrolytic solution held, its permeability, its strength, etc. The positive and negative electrodes and the separator are fixed in position within the cell casing (6) in a manner not to give rise to any problems in use. The shape, size, etc. of the electrodes can properly be determined according to the shape and performance of the desired cell.

The shape of the cell of the invention is not limited to the cylindrical shape as exemplified above, but can also be coin-type, rectangular-type, box-type, etc., and is not particularly limited.

(5) The fifth preferred embodiment of the invention is described below.

In the invention, in the case of preparing an organic electrolytic cell equipped, as stated already, with a positive electrode, a negative electrode and a solution of a lithium salt in an aprotic organic solvent as an electrolytic solution, wherein (1) the positive electrode contains a metallic oxide, (2) the negative electrode is an infusible, insoluble substrate (PAS) having a polyacene type skeletal structure and having a hydrogen/carbon atomic ratio of 0.5 to 0.05, said substrate being a heat-treated product of an aromatic condensation polymer, and (3) the total amount of lithium contained in the cell is 500 mAh/g or more, and the amount of lithium originating in the negative electrode is 100 mAh/g or more, based on the negative electrode PAS.

it is preferred to electrochemically carry lithium originating in the negative electrode on the negative electrode by applying an electric potential equal to or less than the electric potential of metallic Li to the negative electrode.

In the invention, as stated already, the total amount of lithium contained in the cell is the total of lithium originating in the positive electrode, lithium originating in the electrolytic solution, and lithium originating in the negative electrode.

Lithium originating in the positive electrode is lithium contained in the positive electrode at the time of assembly of the cell, and part or all of the lithium is supplied to the negative electrode by an operation (charge or the like) of sending a current from an outer circuit. Lithium originating in the electrolytic solution is lithium in the electrolytic solution contained in the separator, the positive electrode, the negative electrode, etc. Further, lithium originating in the negative electrode is lithium carried on the negative electrode PAS of the invention (lithium other than lithium originating in the positive electrode and lithium originating in the electrolytic solution).

In the invention, as to a method of carrying lithium on the negative electrode PAS, it is possible to previously carry lithium on the negative electrode PAS by, before assembly of the cell, passing a constant current or applying a constant voltage or using a combination thereof, in an electrochemical cell wherein metallic lithium is used as a counter electrode.

In the invention, in previously carrying lithium on the negative electrode PAS, it is particularly preferred to apply an electric potential equal to or less than the electric potential of metallic lithium, at least once, to the negative electrode PAS, based on the electric potential of metallic lithium. The voltage to be applied is varied depending on the desired amount of lithium originating in the negative electrode, PAS, the kind and shape of the electrodes, and the kind and shape of the electrolytic cell, but is preferably 0 mV to −1,000 mV, more preferably −10 mV to −300 mV based on the electric potential of metallic lithium. An important thing is to select such a voltage to be as low as possible so that metallic lithium does not electrodeposit, and in some cases, it is possible to first carry lithium at an electric potential equal to or less than the electric potential of metallic lithium, gradually increase the voltage, and finally complete the carrying at a positive electric potential, or it is also possible to conduct the carrying first at a positive electric potential and then at an electric potential equal to or less than the electric potential of metallic lithium.

The total amount of lithium contained in the cell is 500 mAh/g or more, preferably 600 mAh/g or more, based on the negative electrode PAS, and in the case of under 500 mAh/g, a sufficient capacity cannot be obtained.

Further, the amount of lithium originating in the negative electrode in the invention is 100 mAh/g or more, preferably 150 mAh/g or more, based on the negative electrode PAS, and in the case of under 100 mAh/g, an adequate capacity cannot be obtained, even if the total lithium amount is 500 mAh/g or more based on the negative electrode PAS. Further, when a lithium-containing oxide is used in the positive electrode, it is practical to make the amount of lithium originating in the negative electrode 600 mAh/g or less, based on the negative electrode PAS.

Although as to the amount of lithium originating in the positive electrode and the amount of lithium originating in the electrolytic solution, it is sufficient if the above conditions are satisfied and, it is preferred that the amount of lithium originating in the positive electrode is 300 mAh/g or more, based on the negative electrode PAS.

(6) Further, the sixth preferred embodiment of the invention is described below.

In the invention, in previously carrying, as stated in the above (4), lithium originating in the negative electrode on PAS before assembly of the cell, it is particularly preferred to electrochemically carry lithium originating in the negative electrode using a solution of a lithium salt in a cyclic carbonate solvent.

In this connection, the lithium salt is an electrolyte capable of forming lithium ions such as, for example, $LiClO_4$, $LiAsF_6$, $LiBF_4$ and $LiPF_6$, and as the cyclic carbonate solvent, there can be used a single solvent such as ethylene carbonate or propylene carbonate, or a mixed solvent of two or more thereof. The above electrolyte and solvent are mixed in a state of sufficient dehydration to give an electrolytic solution and for making the internal resistance due to the electrolytic solution small, it is preferred to make the concentration of the electrolyte in the electrolytic solution at least 0.1 mole/liter, and usually, it is further preferred to make the concentration 0.2 to 1.5 moles/liter. A method for previously carrying lithium on the negative electrode PAS is not particularly limited so long as it is possible to accomplish the purpose, and for example, it is possible to previously carry lithium on the negative electrode PAS by using the electrolytic solution, and passing a constant current or applying a constant voltage in an electrochemical cell wherein metallic lithium is used as a counter electrode.

According to the invention described above, there is provided an organic electrolytic cell which is easy to prepare, and is usable as a secondary cell having a high capacity and high voltage.

Further, the organic electrolytic cell of the invention can be such a secondary cell that charge and discharge is possible over a long period and it is excellent in safety.

A secondary cell having a particularly high capacity is provided by combining one or more of the above-mentioned first, second, third, fourth, fifth and sixth preferred embodiments of the invention.

Further, the third and fourth preferred embodiments of the invention are advantageous because thereby are provided secondary cells having low internal resistance and high capacity.

Further, the above fifth preferred embodiment of the invention has an advantage of making it possible to prepare the above secondary cell having a high capacity and high voltage more easily.

The invention is described below by examples. However, the following examples are for specifically describing the embodiments of the invention, and the invention is not limited to the following examples at all, and is not restricted thereby at all.

13

The basal constitution of the cell according to the invention shown in the attached drawing FIG. 1 is as follows.

1 Positive electrode
2 Negative electrode
3, 3' Current collector
4 Electrolytic solution
5 Separator
6 Cell casing
7, 7' Outside terminals Further, the basal constitution of the cell according to the invention shown in the attached drawing FIG. 2 is as follows.

1 Positive electrode
2 Negative electrode
3 Current collector (positive electrode)
3' Current collector (negative electrode)
8 Insulating packing
5 Separator
6 Cell casing
9 Top cap
10 Terminal (positive electrode)
10' Terminal (negative electrode)

EXAMPLE 1

A phenol-formaldehyde resin forming plate 0.5 mm thick was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). The resultant PAS plate was ground using a disc mill to give PAS powder having an average particle size of 15 μm. Its H/C ratio was 0.22.

Then, 100 weight parts of the PAS powder, and 100 weight parts of a solution of 10 weight parts of polyvinylidene fluoride powder in 90 weight parts of N,N-dimethylformamide were adequately mixed to give a slurry. The slurry was applied onto a copper foil 10 μm thick (a current collector for the negative electrode) using an applicator, heat-dried, and pressed to give a PAS negative electrode 110 μm thick.

50 weight parts of a solution of 10 weight parts of polyvinylidene fluoride powder in 90 weight parts of N,N-dimethylformamide was adequately mixed with 100 parts of commercially available $LiCoO_2$ (made by Strem Chemicals Co.) and 5 parts of graphite to give a slurry. The slurry was applied an aluminum foil 20 μm thick (a current collector for the positive electrode) using an applicator, dried, and pressed to give a PAS positive electrode 1 having a thickness of 150 μm.

The above negative electrode was doped with lithium in amounts of 150 mAh/g, 200 mAh/g and 300 mAh/g, based on the negative electrode PAS, at a constant current (a current was sent whereby 30 mAh/g of lithium could be carried per hour on the negative electrode PAS), using lithium as a counter electrode and using a solution of $LiPF_6$ at a concentration of 1 mole/liter in a 1:1 (weight ratio) mixed solvent of propylene carbonate and diethyl carbonate as an electrolytic solution, whereby the lithium was carried thereon (lithium originating in the negative electrode). The resultant negative electrodes were designated Negative electrodes 1, 2 and 3, respectively.

Three kinds of cells as shown in FIG. 1 were assembled using the above positive electrode and Negative electrodes

14

1, 2 and 3 (each 1×1 $cm^2$). As the separator, a polypropylene separator 25 μm thick was used. Further, as the electrolytic solution a solution of $LiPF_6$ was used at a concentration of 1 mole/liter in a 1:1 (weight ratio) mixed solvent of propylene carbonate and diethyl carbonate. The total lithium amount in the cell based on the negative electrode PAS is shown in Table 1.

Each of the above cells was charged at a constant current of 0.25 $mA/cm^2$ until the cell voltage became 4.3 V, and successively, discharged at a constant current of 0.25 $mA/cm^2$ until the cell voltage became 2.5 V. This 4.3 V–2.5 V cycle was repeated, and in the third discharge, an evaluation was made using volume capacity (mAh/cc). As the volume standard, the total of the electrode volumes, the separator volume and the current collector volumes was used. The results are shown in the following Table 1.

TABLE 1

| Positive electrode | Negative electrode | Total lithium amount in the cell (mAh/g) | Lithium amount originating in the negative electrode (mAh/g) | Volume capacity (mAh/cc) |
|---|---|---|---|---|
| 1 | 1 | 890 | 150 | 131 |
| 1 | 2 | 940 | 200 | 141 |
| 1 | 3 | 1040 | 300 | 155 |

EXAMPLE 2

Positive electrodes having thicknesses of 100 μm and 200 μm were obtained in the same manner as in Example 1, and designated Positive electrode 2 and Positive electrode 3, respectively.

Cells were assembled in the same manner as in Example 1 using combinations of Positive electrode 2 with Negative electrode 2, and Positive electrode 3 with Negative electrode 3, and an evaluation was made using volume capacity. The results are shown in the following Table 2.

TABLE 2

| Positive electrode | Negative electrode | Total lithium amount in the cell (mAh/g) | Lithium amount originating in the negative electrode (mAh/g) | Volume capacity (mAh/cc) |
|---|---|---|---|---|
| 2 | 2 | 680 | 200 | 121 |
| 3 | 2 | 1190 | 200 | 146 |

Comparative Example 1

Positive electrode 4 having a thickness of 260 μm was obtained in the same manner as in Example 1. As the negative electrode, Negative electrode 4 on which lithium was not previously carried was used. Cells were assembled in the same manner as in Example 1 using combinations between Positive electrodes 1, 3 or 4 and Negative electrode 4, and an evaluation was made using volume capacity. The results are shown in the following Table 3.

TABLE 3

| Positive electrode | Negative electrode | Total lithium amount in the cell (mAh/g) | Lithium amount originating in the negative electrode (mAh/g) | Volume capacity (mAh/cc) |
| --- | --- | --- | --- | --- |
| 1 | 4 | 740 | 0 | 95 |
| 3 | 4 | 990 | 0 | 104 |
| 4 | 4 | 1350 | 0 | 105 |

When the lithium amount originating in the negative electrode is 0, sufficient capacity was not obtained, however large the total lithium amount in the cell.

Comparative Example 2

Negative electrode 5 was obtained in the same manner as in Example 1 except that the lithium amount to be previously carried was changed to 50 mAh/g. A cell was assembled in the same manner as in Example 1 using a combination between Positive electrode 1 and Negative electrode 5, and an evaluation was made using volume capacity. The results are shown in the following Table 4.

TABLE 4

| Positive electrode | Negative electrode | Total lithium amount in the cell (mAh/g) | Lithium amount originating in the negative electrode (mAh/g) | Volume capacity (mAh/cc) |
| --- | --- | --- | --- | --- |
| 1 | 5 | 790 | 50 | 103 |

When the lithium amount originating in the negative electrode (in this example, lithium with which the previous doping was made) was small, sufficient capacity was not obtained, even if the total lithium amount in the cell is sufficient.

(1) Examples of the first preferred embodiment of the invention are set forth below.

EXAMPLE 3

50 weight parts of a xylene resin (made by Lignte Co.), 50 weight parts of novolak (made by Showa Kobunshi Co. Ltd.) and 0.1 weight part of xylenesulfonic acid were heated at 100° C. to give a xylene-modified novolak resin. 10 weight parts of hexamethylenetetramine was mixed with 100 weight parts of the resin, and the mixture was ground and then formed by thermal pressing into a formed plate.

The formed plate of the xylene-modified novolak resin was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). The resultant PAS plate was ground using a disc mill to give PAS powder having an average particle size of 15 µm. Its H/C ratio was 0.22. The amount of gas adsorbed on the PAS fine particles at a nitrogen adsorption thickness of 10 Å was 29 cc/g.

Then, 100 weight parts of the PAS powder, and 100 weight parts of a solution of 10 weight parts of polyvinylidene fluoride powder in 90 weight parts of N,N-dimethylformamide were adequately mixed to give a slurry. The slurry was applied onto a copper foil 10 µm thick (a current collector for the negative electrode) using an applicator, dried, and pressed to give a PAS negative electrode 110 µm thick.

50 weight parts of a solution of 10 weight parts of polyvinylidene fluoride powder in 90 weight parts of N,N-dimethylformamide was adequately mixed with 100 parts of commercially available LiCoO$_2$ (made by Strem Chemicals Co.) and 5 parts of graphite to give a slurry. The slurry was applied onto an aluminum foil 20 µm thick (a current collector for the positive electrode) using an applicator, dried, and pressed to give a PAS positive electrode 5 having a thickness of 165 µm.

The above negative electrode was doped with lithium in amounts of 150 mAh/g, 200 mAh/g and 300 mAh/g based on the negative electrode PAS at a constant current (a current was sent whereby 30 mAh/g of lithium could be carried per hour on the negative electrode PAS), using lithium as a counter electrode and using a solution of LiPF$_6$ at a concentration of 1 mole/liter in a 1:1 (weight ratio) mixed solvent of propylene carbonate and diethyl carbonate as an electrolytic solution, whereby the lithium was carried thereon (lithium originating in the negative electrode). The resultant negative electrodes were designated Negative electrodes 6, 7 and 8, respectively. Three kinds of cells as shown in FIG. 1 were assembled using the above positive electrode and Negative electrodes 6, 7 and 8 (each 1×1 cm$^2$). As the separator, a polypropylene separator 25 µm thick was used. Further, as the electrolytic solution, a solution of LiPF$_6$ at a concentration of 1 mole/liter in a 1:1 (weight ratio) mixed solvent of propylene carbonate and diethyl carbonate was used. The total lithium amount in the cell based on the negative electrode PAS is shown in Table 5.

Each of the above cells was charged at a constant current of 0.25 mA/cm$^2$ until the cell voltage became 4.3 V, and successively, discharged at a constant current of 0.25 mA/cm$^2$ until the cell voltage became 2.5 V. This 4.3 V–2.5 V cycle was repeated, and in the third discharge, an evaluation was made using volume capacity (mAh/cc). As the volume standard the total of the electrode volumes, the separator volume and the current collector volumes was used. The results are shown in the following Table 5.

TABLE 5

| Negative electrode | Nitrogen adsorption amount at an adsorption thickness of 10 Å (cc/g) | Total lithium amount in the cell (mAh/g) | Lithium amount originating in the negative electrode (mAh/g) | Volume capacity (mAh/cc) |
| --- | --- | --- | --- | --- |
| 6 | 29 | 990 | 150 | 151 |
| 7 | 29 | 1020 | 200 | 157 |
| 8 | 29 | 1130 | 300 | 171 |

EXAMPLE 4

Negative electrodes were obtained in the same manner as in Example 3 except that the composition of the raw materials for PAS was changed to 30 weight parts of the xylene resin and 70 weight parts of the novolak, or 10 weight parts of the xylene resin and 90 weight parts of the novolak. The resultant negative electrodes were doped respectively with lithium in amounts of 300 mAh/g based on the negative electrode PAS, whereby the lithium was carried thereon to give Negative electrode 9 and Negative electrode 10, respectively.

Cells were assembled in the same manner as in Example 3, and an evaluation was made using volume capacity. The results are shown in the following Table 6.

TABLE 6

| Negative electrode | Nitrogen adsorption amount at an adsorption thickness of 10 Å (cc/g) | Total lithium amount in the cell (mAh/g) | Lithium amount originating in the negative electrode (mAh/g) | Volume capacity (mAh/cc) |
| --- | --- | --- | --- | --- |
| 9 | 60 | 1130 | 300 | 162 |
| 10 | 83 | 1130 | 300 | 151 |

Comparative Example 3

Two of the same negative electrodes were obtained in the same manner as in Example 3 except that the composition of the raw materials for PAS was changed to 30 weight parts of the xylene resin and 70 weight parts of the novolak. As to one of the negative electrodes, lithium was not previously carried thereon, and the other negative electrode was doped with lithium in amounts of 50 mAh/g based on the negative electrode PAS, whereby the lithium was carried thereon. The resultant negative electrodes were designated Negative electrode 11 and Negative electrode 12, respectively.

Cells were assembled in the same manner as in Example 3, and an evaluation was made using volume capacity. The results are shown in the following Table 7.

TABLE 7

| Negative electrode | Nitrogen adsorption amount at an adsorption thickness of 10 Å (cc/g) | Total lithium amount in the cell (mAh/g) | Lithium amount originating in the negative electrode (mAh/g) | Volume capacity (mAh/cc) |
| --- | --- | --- | --- | --- |
| 11 | 60 | 820 | 0 | 109 |
| 12 | 60 | 870 | 50 | 120 |

Comparative Example 4

Negative electrodes were obtained in the same manner as in Example 3 except that the composition of the raw materials for PAS was changed to a composition of 100 weight parts of the novolak and 10 weight parts of hexamethylenetetramine, or such a composition that only powdered resol ("ResiTop" made by Showa Kobunshi Co., Ltd.) was used as the raw material. These negative electrodes were doped with lithium in an amount of 300 mAh/g based on the negative electrode PAS, whereby the lithium was carried thereon. The resultant negative electrodes were designated Negative electrode 13 and Negative electrode 14, respectively.

Cells were assembled in the same manner as in Example 3, and an evaluation was made using volume capacity. The results are shown in the following Table 8.

TABLE 8

| Negative electrode | Nitrogen adsorption amount at an adsorption thickness of 10 Å (cc/g) | Total lithium amount in the cell (mAh/g) | Lithium amount originating in the negative electrode (mAh/g) | Volume capacity (mAh/cc) |
| --- | --- | --- | --- | --- |
| 13 | 120 | 1140 | 300 | 130 |
| 14 | 132 | 1120 | 300 | 131 |

(2) Examples of the second preferred embodiment of the invention are described below.

EXAMPLE 5

A formed plate of a phenol resin 0.5 mm thick was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). Its H/C ratio was 0.22. The resultant PAS plate was ground in an alumina-made pot mill with different grinding times to give PAS powders respectively having the particle size distributions shown in Table 9 (No. 1, No. 2, No. 3 and No. 4). The particle size distribution was measured by dispersing the resultant fine particles into water using ultrasonic waves and then using a laser diffraction-type particle size distribution measuring apparatus.

TABLE 9

| | Electrode raw material fine particles | | | | | |
| --- | --- | --- | --- | --- | --- | --- |
| | Average | | | | Electrode | |
| PAS fine particle No. | particle size (μm) | 50% size (μm) 2a | Particles having a particle size of a or less (%) | Particles having a particle size of 4a or more (%) | Negative electrode No. | Porosity (%) |
| 1 | 10.2 | 9.5 | 26 | 14 | 15 | 38 |
| 2 | 6.0 | 4.3 | 28 | 28 | 16 | 33 |
| 3 | 3.6 | 2.4 | 31 | 25 | 17 | 29 |
| 4 | 2.6 | 1.6 | 23 | 27 | 18 | 30 |

Then, 100 weight parts of any one of the above PAS powders, and 100 weight parts of a solution of 10 weight parts of polyvinylidene fluoride powder in 90 weight parts of N,N-dimethylformamide were adequately mixed to give a slurry. The slurry was applied onto a copper foil 10 μm thick (a current collector for the negative electrode) using an applicator, dried, and pressed to give a PAS negative electrode 110 μm thick. The porosity of the negative electrode was determined by impregnating the negative electrode with propylene carbonate at 25° C. The density of the used propylene carbonate was 1.20 g/cc (measured by a pycnometer). The results are shown together in Table 9. 50 weight parts of a solution of 10 weight parts of polyvinylidene fluoride powder in 90 weight parts of N,N-dimethylformamide was adequately mixed with 100 parts of commercially available LiCoO$_2$ (made by Strem Chemicals Co.) and 5 parts of graphite to give a slurry. The slurry was applied onto an aluminum foil 20 μm thick (a current collector for the positive electrode) using an applicator, dried, and pressed. Thereby, Positive electrodes 6 and 7 were obtained having thicknesses of 160 μm and 180 μm, respectively.

Each of the above negative electrodes was doped with lithium in an amount of 300 mAh/g based on the negative electrode PAS at a constant current (a current was sent whereby 30 mAh/g of lithium could be carried per hour on the negative electrode PAS), using lithium as a counter electrode and using a solution of LiPF$_6$ at a concentration of 1 mole/liter in a 1:1 (weight ratio) mixed solvent of propylene carbonate and diethyl carbonate as an electrolytic solution, whereby the lithium was carried thereon (lithium originating in the negative electrode).

The above positive electrodes 6 and 7 were combined with the negative electrodes 15, 16, 17 and 18 (each 1×1 cm$^2$) so that the total lithium amount in the cell became about 1,100 mAh/g based on the negative electrode PAS, and five kinds of cells as shown in FIG. 1 were assembled. As the separator, a polypropylene separator 25 μm thick was used. Further, as the electrolytic solution, a solution of LiPF$_6$ at a concentration of 1 mole/liter in a 1:1 (weight ratio) mixed solvent of propylene carbonate and diethyl carbonate was used. The total lithium amount in the cell based on the negative electrode PAS is shown in Table 10.

Each of the above cells was charged at a constant current of 0.25 mA/cm$^2$ until the cell voltage became 4.3 V, and successively, discharged at a constant electric current of 0.25 mA/cm$^2$ until the cell voltage became 2.5 V. This 4.3 V–2.5 V cycle was repeated, and in the third discharge, an evaluation was made using volume capacity (mAh/cc). As the volume standard, the total of the electrode volumes, the separator volume and the current collector volumes was used. The results are also shown in Table 10.

TABLE 10

| Negative electrode | Positive electrode | Total lithium amount in the cell (mAh/g) | Lithium amount originating in the negative electrode (mAh/g) | Volume capacity (mAh/cc) |
|---|---|---|---|---|
| 15 | 6 | 1100 | 300 | 155 |
| 16 | 7 | 1170 | 300 | 173 |
| 17 | 7 | 1105 | 300 | 173 |
| 18 | 7 | 1120 | 300 | 168 |

EXAMPLE 6

Positive electrodes 8, 9 and 10 having thicknesses of 240 μm, 210 μm and 200 μm, respectively, were obtained in the same manner as in Example 5. The amounts of lithium originating in the negative electrode of Negative electrode 17 were made to be 0 mAh/g (comparative), 150 mAh/g and 200 mAh/g (the invention), and the resultant negative electrodes were combined with the above positive electrodes, in the same manner as in Example 5, and cells were assembled and evaluated using volume capacity, in the same manner as in Example 5. The results are shown in Table 11.

TABLE 11

| Negative electrode | Positive electrode | Total lithium amount in the cell (mAh/g) | Lithium amount originating in the negative electrode (mAh/g) | Volume capacity (mAh/cc) |
|---|---|---|---|---|
| 17 | 8 | 1080 | 0 | 119 |
| 17 | 9 | 1095 | 150 | 148 |
| 17 | 10 | 1100 | 200 | 161 |

When the lithium amount originating in the negative electrode is 0, a sufficient capacity was not obtained.

Comparative Example 5

A formed plate of a phenol resin 0.5 mm thick was put in a silicon carbide heating element, the inside temperature was increased at a rate of 10° C./hour in an atmosphere of nitrogen, and heat treatment was conducted up to 650° C. to synthesize a PAS. Its H/C ratio was 0.22. The resultant PAS plate was ground using a jet mill to give PAS powders respectively having the particle size distributions shown in Table 4 (No. 5, No. 6 and No. 7). Negative electrodes (No. 19, No. 20 and No. 21) were obtained and the porosities of them were determined, in the same manner as in Example 5. The results are shown in Table 12.

TABLE 12

| | Electrode raw material fine particles | | | | Electrode | |
|---|---|---|---|---|---|---|
| PAS fine particle No. | Average particle size (μm) | 50% size (μm) 2a | Particles having a particle size of a or less (%) | Particles having a particle size of 4a or more (%) | Negative electrode No. | Porosity (%) |
| 5 | 22 | 21 | 24 | 22 | 19 | 38 |
| 6 | 8.5 | 7.7 | 4 | 6 | 20 | 46 |
| 7 | 2.5 | 2.1 | 12 | 9 | 21 | 45 |

Positive electrodes 11 and 12 having thicknesses of 150 μm and 130 μm, respectively, were obtained in the same manner as in Example 5. Thereafter, 300 mAh/g of lithium originating in the negative electrode was carried on each of the negative electrodes of the above No. 19 to 21 in the same manner as in Example 5, and an evaluation was conducted in the same manner as in Example 5. The results are shown in Table 13.

TABLE 13

| Negative electrode | Positive electrode | Total lithium amount in the cell (mAh/g) | Lithium amount originating in the negative electrode (mAh/g) | Volume capacity (mAh/cc) |
| --- | --- | --- | --- | --- |
| 19 | 11 | 1090 | 300 | 116 |
| 20 | 12 | 1120 | 300 | 124 |
| 21 | 12 | 1100 | 300 | 126 |

Comparative Example 6

PAS No. 2 of Example 5 was used, and 100 weight parts of the PAS powder was adequately mixed with 110 weight parts of a solution of 10 weight parts of polyvinylidene fluoride powder in 90 weight parts of N,N-dimethylformamide to give a slurry. The slurry was applied onto an copper foil 10 μm thick (a current collector for the negative electrode) using an applicator, and dried to give a PAS negative electrode 110 μm thick. The porosity of the negative electrode was determined by impregnating it with propylene carbonate at 25° C., and was 46%.

A positive electrode 130 μm thick was obtained in the same manner as in Example 1. Thereafter, 300 mAh/g of lithium originating in the negative electrode was carried on the negative electrode in the same manner is in Example 5, and a evaluation was conducted in the same manner as in Example 5. The volume capacity of the resultant cell was 131 mAh/g.

(3) An examples of the third preferred embodiment of the invention is described below.

EXAMPLE 7

A formed plate of a phenol resin 0.5 mm thick was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). The resultant PAS plate was ground in a pot mill to give PAS powder having an average particle size of about 3 μm. Its H/C ratio was 0.22.

Then, 100 weight parts of the above PAS powder, and 100 weight parts of a solution of 10 weight parts of polyvinylidene fluoride powder having a melting point of 172° C. in 90 weight parts of N,N-dimethylformamide were adequately mixed to give a slurry. The slurry was applied onto a copper foil 10 μm thick (a current collector for the negative electrode) using an applicator, dried, and pressed to give a PAS negative electrode 210 μm thick wherein both sides of the foil were coated with PAS. The PAS negative electrode was heat treated in vacuo at 100° C., 160° C., 190° C. or 220° C. to give Negative electrodes 22, 23, 24 and 25.

50 weight parts of a solution of 10 weight parts of polyvinylidene fluoride powder in 90 weight parts of N,N-dimethylformamide was adequately mixed with 100 parts of commercially available LiCoO$_2$ (made by Strem Chemicals Co.) and 5 parts of graphite to give a slurry. The slurry was applied onto an aluminum foil 20 μm thick (a current collector for the positive electrode) using an applicator, dried, and pressed. Thereby was obtained a positive electrode 340 μm thick wherein both sides of the aluminum foil were coated with LiCoO$_2$.

Each of the above negative electrodes was doped with lithium in an amount of 300 mAh/g based on the negative electrode PAS at a constant current (a current was sent whereby 30 mAh/g of lithium could be carried per hour on the negative electrode PAS), using lithium as a counter electrode and using a solution of LiPF$_6$ at a concentration of 1 mole/liter in a 1:1 (weight ratio) mixed solvent of propylene carbonate and diethyl carbonate as an electrolytic solution, whereby the lithium was carried thereon (lithium originating in the negative electrode). The resultant negative electrodes were designated Negative electrodes 22, 23, 24 and 25.

A cylindrical cell as shown in FIG. 2 was assembled using the above positive electrode 1, and any one of Negative electrodes 22, 23, 24 and 25 (each 4×35 cm$^2$). As the separator, a polypropylene separator 25 μm thick was used. As the positive terminal an aluminum terminal 150 μm thick and 5 mm wide was used, and as the negative terminal, a nickel terminal having the same size as the aluminum terminal was use a, and these terminals were attached to the ends of both electrodes, respectively. Further, as the electrolytic solution, a solution of LiPF$_6$ at a concentration of 1 mole/liter in a 1:1 (weight ratio) mixed solvent of propylene carbonate and diethyl carbonate was used. The total lithium amount in the cell based on the negative electrode PAS was 1,170 mAh/g on each cell. In this connection, when Negative electrode 1 of 100° C. treatment was used, the electrode peeled off from the metallic foil at the time of winding of the electrode, and a cell could not be obtained.

Each of the resultant cells was charged at a constant current of 0.25 mA/cm$^2$ until the cell voltage became 4.3 V, and the internal resistance thereof was measured, and then, successively, the cell was discharged at a constant current of 0.25 mA/cm$^2$ until the cell voltage became 2.5 V. This 4.3 V–2.5 V cycle was repeated, and in the third discharge an, evaluation was made using volume capacity (mAh/cc). As the volume standard, the total of the electrode volumes, the separator volumes and the current collector volumes was used. The results are also shown in Table 14.

TABLE 14

| Negative electrode No. | Heat treatment (°C.) | Internal resistance (mΩ) | Volume capacity (mAh/cc) |
| --- | --- | --- | --- |
| 22 | 100 | Peeling of the electrode at the time of winding | |
| 23 | 160 | 230 | 132 |
| 24 | 190 | 120 | 168 |
| 25 | 220 | 120 | 164 |

In the cases of the negative electrodes 24 and 25, which are preferred examples of the invention, the internal resistances are lower and the volume capacities are higher, compared with the cases of the negative electrodes 22 and 23.

Comparative Example 7

Positive electrode 2 having a thickness of 460 μm was obtained in the same manner as in Example 7. The sizes of the positive electrode and negative electrode were made to be equally 4×30 cm$^2$.

The amount of lithium originating in any of the negative electrodes was made to be 0 mAh/g, and the above positive electrode was combined with any one of the negative electrodes 22, 23, 24 and 25. Then, cells were assembled and their evaluation was made by their volume capacities, in the same manner as in Example 7. The total lithium amount in each cell based on the negative electrode PAS was 1,090 mAh/g. The results are shown in Table 15.

TABLE 15

| Negative electrode No. | Heat treatment (°C.) | Internal resistance (mΩ) | Volume capacity (mAh/cc) |
| --- | --- | --- | --- |
| 22 | 100 | 230 | 99 |
| 23 | 160 | 225 | 101 |
| 24 | 190 | 160 | 116 |
| 25 | 220 | 155 | 118 |

(4) Examples of the fourth preferred embodiment of the invention are described below.

EXAMPLE 8

A formed plate of a phenol resin 0.5 mm thick was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). The resultant PAS plate was ground in a disc mill to give PAS powder having an average particle size of about 15 µm. Its H/C ratio was 0.22.

Then, 100 weight parts of the above PAS powder, and 100 weight parts of a solution of 10 weight parts of polyvinylidene fluoride powder in 90 weight parts of N,N-dimethylformamide were adequately mixed to give a slurry. The slurry was applied onto a copper foil 10 µm thick (a current collector for the negative electrode) using an applicator, dried, and pressed to give a PAS negative electrode 210 µm thick wherein both sides of the foil were coated with PAS.

50 weight parts of a solution of 10 weight parts of polyvinylidene fluoride powder in 90 weight parts of N,N-dimethylformamide was adequately mixed with 100 parts of commercially available LiCoO$_2$ (made by Strem Chemicals Co.) and 5 parts of graphite to give a slurry. The slurry was applied onto an aluminum foil 20 µm thick (a current collector for the positive electrode) using an applicator, dried, and pressed. Thereby was obtained a positive electrode 280 µm wherein both sides of the foil were coated with LiCoO$_2$.

The above negative electrode was doped with lithium in an amount of 300 mAh/g based on the negative electrode PAS at a constant current (a current was sent whereby 30 mAh/g of lithium could be carried per hour on the negative electrode PAS), using lithium as a counter electrode and using a solution of LiPF$_6$ at a concentration of 1 mole/liter in a 1:1 (weight ratio) mixed solvent of propylene carbonate and diethyl carbonate as an electrolytic solution, whereby the lithium was carried thereon (lithium originating in the negative electrode).

A cylindrical cell as shown in FIG. 2 was assembled using the above positive electrode and negative electrode (each 4×35 cm$^2$). As the separator, a polypropylene separator 25 µm thick was used. As the positive terminal, an aluminum terminal 150 µm thick and 5 mm wide was used, and as the negative terminal a nickel terminal having the same size as the aluminum terminal was used, and these terminals were attached to the ends of both electrodes, respectively. Further, as the electrolytic solution, a solution of LiPF$_6$ at a concentration of 1 mole/liter in a 1:1 (weight ratio) mixed solvent of propylene carbonate and diethyl carbonate was used. The total lithium amount in the cell based on the negative electrode PAS was 1,040 mAh/g.

The resultant cell was charged at a constant current of 0.25 mA/cm$^2$ until the cell voltage became 4.3 V, and the internal resistance thereof was measured, and then, successively, the cell was discharged at a constant current of 0.25 mA/cm$^2$ until the cell voltage became 2.5 V. This 4.3 V–2.5 V cycle was repeated, and in the third discharge, an evaluation was made using volume capacity (mAh/cc). As the volume standard, the total of the electrode volumes, the separator volumes and the current collector volumes was used. The results are also shown in Table 16.

Comparative Example 8

A positive electrode 380 µm thick was obtained in the same manner as in Example 8. The sizes of the positive electrode and negative electrode were made to be equally 4×30 cm$^2$.

The amount of lithium originating in the negative electrode was made to be 0 mAh/g, a cell was assembled in the same manner as in Example 8, and its evaluation was made by volume capacity. The total lithium amount in the cell based on the negative electrode PAS was 1,010 mAh/g. The results are shown in Table 16.

Comparative Example 9

In Example 8, metallic lithium in an amount of 300 mAh/g (about 12 µm) was stuck on the negative electrode PAS, and then, two cylindrical cells as in Example 8 were assembled. The cells were left alone at room temperature for 3 days, and when one of them was decomposed, the metallic lithium completely disappeared. An evaluation was made by volume capacity in the same manner as in Example 8. The total lithium amount in this cell was 1,040 mAh/g. The results are shown in Table 16.

When the lithium amount originating in the negative electrode was 0, a sufficient capacity could not be obtained, and when lithium originating in the negative electrode was carried in the cell, the internal resistance of the cell was increased and the cell capacity was lowered.

EXAMPLE 9

In Example 8, metallic lithium (about 200 µm) was stuck on the negative electrode PAS, the resultant matter was held between polypropylene plates, each being 2 mm thick, and lithium originating in the negative electrode was carried on the negative electrode PAS in the same electrolytic solution as in Example 1. About 40 minutes later, the metallic lithium was peeled from the PAS negative electrode and the PAS negative electrode was doped with 300 mAh/g of lithium. Thereafter, a cylindrical cell as in Example 8 was assembled and an evaluation was made by volume capacity in the same manner as in Example 8. The total lithium amount in this cell was 1,040 mAh/g. The results are shown in Table 16.

EXAMPLE 10

In Example 8, lithium originating in the negative electrode was carried on the negative electrode PAS by short-circuiting the counter electrode metallic lithium (about 200 µm) and the negative electrode PAS. Thereby, the negative electrode PAS could be doped with 300 mAh/g of lithium in about 35 minutes. Thereafter, a cylindrical cell as in Example 8 was assembled, and an evaluation was made by volume capacity in the same manner as in Example 8. The total lithium amount in this cell was 1,040 mAh/g. The results are shown in Table 16.

Each of the resultant cells was charged at a constant current of 0.25 mA/cm$^2$ until the cell voltage became 4.3 V, and then, successively, the cell was discharged at a constant current of 0.25 mA/cm$^2$ until the cell voltage became 2.5 V. This 4.3 V–2.5 V cycle was repeated, and in the third discharge, an evaluation was made using volume capacity

TABLE 16

| Negative electrode No. | Lithium originating in the negative electrode | Lithium amount originating in the negative electrode (mAh/g) | Volume capacity (mAh/cc) | Internal resistance (mΩ) |
| --- | --- | --- | --- | --- |
| Example 8 | Before assembly | 300 | 151 | 160 |
| Comparative example 8 | Before assembly | 0 | 98 | 200 |
| Comparative example 9 | After assembly | 300 | 117 | 360 |
| Example 9 | Before assembly | 300 | 149 | 150 |
| Example 10 | Before assembly | 300 | 153 | 150 |

(5) An example of the fifth preferred embodiment of the invention is described below.

EXAMPLE 11

A formed plate of a phenol resin 0.5 mm thick was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). The resultant PAS plate was ground in a disc mill to give PAS powder having an average particle size of about 15 μm. Its H/C ratio was 0.22.

Then, 100 weight parts of the above PAS powder, and 100 weight parts of a solution of 10 weight parts of polyvinylidene fluoride powder in 90 weight parts of N,N-dimethylformamide were adequately mixed to give a slurry. The slurry was applied onto a copper foil 10 μm thick (a current collector for the negative electrode) using an applicator, dried, and pressed to give a PAS negative electrode 210 μm thick wherein both sides of the foil were coated with PAS.

50 weight parts of a solution of 10 weight parts of polyvinylidene fluoride powder in 90 weight parts of N,N-dimethylformamide was adequately mixed with 100 parts of commercially available LiCoO$_2$ (made by Strem Chemicals Co.) and 5 parts of graphite to give a slurry. The slurry was applied onto a aluminum foil 20 μm thick (a current collector for the positive electrode) using an applicator, dried, and pressed. Thereby was obtained a positive electrode 280 μm thick wherein both sides of the foil were coated with LiCoO$_2$.

An electrolytic cell having a lithium reference electrode was assembled, using the above negative electrode, and lithium as a counter electrode, and using, as the electrolytic solution, a solution of LiPF$_6$ at a concentration of 1 mole/liter in a 1:1 (weight ratio) mixed solvent of propylene carbonate and diethyl carbonate. A constant voltage was applied so that the PAS negative electrode became +20 mV, 0 mV, –20 mV, –50 mV or –100 mV, based on the lithium reference electrode, and time needed for carrying 300 mAh/g of lithium originating in the negative electrode was measured. The results are shown in Table 17.

A cell as shown in FIG. 1 was assembled using the above positive electrode 1 and negative electrode (each 1×1 cm$^2$) . As the separator, a polypropylene separator 25 μm thick was used. The total lithium amount in the cell based on the negative electrode PAS was 1,040 mAh/g.

(mAh/cc). As the volume standard, the total of the electrode volumes, the separator volumes and the current collector volumes was used. The results are also shown in Table 17.

TABLE 17

| Voltage applied on the negative electrode lithium | Time needed for carrying lithium originating in the negative electrode (minute) | Volume capacity (mAh/cc) |
| --- | --- | --- |
| +20 mV Comparison | 43 minutes (No deposition of lithium) | 152 |
| 0 mV The invention | 29 minutes (No deposition of lithium) | 153 |
| –20 mV The invention | 24 minutes (No deposition of lithium) | 149 |
| –50 mV The invention | 20 minutes (No deposition of lithium) | 152 |
| –100 mV The invention | 16 minutes (No deposition of lithium) | 150 |

Comparative Example 10

In Example 11, metallic lithium (about 200 μm) was adhered to the negative electrode PAS, the resultant matter was held between polypropylene plates, each being 2 mm thick, and lithium originating in the negative electrode was carried on the negative electrode PAS in the same electrolytic solution as in Example 1. About 40 minutes later, the metallic lithium was peeled from the PAS negative electrode and the PAS negative electrode was doped with 300 mAh/g of lithium. It takes more time, compared with the case where a negative voltage was applied.

Comparative Example 11

In Example 11, lithium originating in the negative electrode was carried on the negative electrode PAS by short-circuiting the counter electrode metallic lithium (about 200 μm) and the negative electrode PAS. Thereby, the negative electrode PAS could be doped with 300 mAh/g of lithium in about 35 minutes. It takes more time, compared with the case where a negative voltage was applied.

Comparative Example 12

A formed plate of a phenol resin 0.5 mm thick was put in a silicon carbide heating element, the inside temperature was increased at a rate of 10° C./hour in an atmosphere of nitrogen, and heat treatment was conducted up to 1,000° C. to give a carbonaceous material. The resultant PAS plate was ground in a disc mill to give a powder of the carbonaceous material having an average particle size of about 13 μm. Its H/C ratio was 0.02.

The carbonaceous material was made into an electrode in the same manner as in Example 11, and lithium originating in the negative electrode was carried thereon in the same manner as in Example 11. In the case of +20 mV, the time needed for the carrying was 50 minutes, and in the case of 0 mV, the time needed for the carrying was 45 minutes, and when −20 mV, −50 mV and −100 mV were applied, respectively, metallic lithium was deposited on the negative electrode carbonaceous material. When the resultant negative electrodes were left alone, the metallic lithium disappeared after about 30 hours after the start of the leaving alone, but these methods are not practical as methods for carrying lithium originating in the negative electrode.

Further, when a cell similar to that in Example 11 was assembled using the negative electrode prepared by the application of +20 mV, and evaluated, a large amount of metallic lithium was deposited on the negative electrode after the cycle was conducted three times.

(6) Examples of the sixth preferred embodiment of the invention are described below.

EXAMPLE 12

A formed plate of a phenol resin 0.5 mm thick was put in a silicon carbide heating element, the inside temperature was increased at a rate of 10° C./hour in an atmosphere of nitrogen, and heat treatment was conducted up to 650° C. to synthesize an infusible, insoluble substrate (referred to as PAS). The resultant PAS plate was ground in a disc mill to give PAS powder having an average particle size of about 15 μm. Its H/C ratio was 0.22.

Then, 100 weight parts of the above PAS powder, and 100 weight parts of a solution of 10 weight parts of polyvinylidene fluoride powder in 90 weight parts of N,N-dimethylformamide were adequately mixed to give a slurry. The slurry was applied onto a copper foil 10 μm thick (a current collector for the negative electrode) using an applicator, dried, and pressed to give a PAS negative electrode 210 μm thick wherein both sides of the foil were coated with PAS.

50 weight parts of a solution of 10 weight parts of polyvinylidene fluoride powder in 90 weight parts of N,N-dimethylformamide was adequately mixed with 100 parts of commercially available $LiCoO_2$ (made by Strem Chemicals Co.) and 5 parts of graphite to give a slurry. The slurry was applied onto a aluminum foil 20 μm thick (a current collector for the positive electrode) using an applicator, dried, and pressed. Thereby was obtained a positive electrode 280 μm thick wherein both sides of the foil were coated with $LiCoO_2$.

The above negative electrode was doped with lithium in an amount of 300 mAh/g based on the negative electrode PAS at a constant current (a current was sent whereby 30 mAh/g of lithium could be carried per hour on the negative electrode PAS), using lithium as a counter electrode and using a solution of $LiPF_6$ at a concentration of 1 mole/liter in propylene carbonate and diethyl carbonate as an electrolytic solution, whereby the lithium was carried thereon (lithium originating in the negative electrode).

A cell as shown in FIG. 1 was assembled using the above positive electrode and negative electrode (each 1×1 cm²). As the separator, a polypropylene separator 25 μm thick was used. Further, as the electrolytic solution, a solution of $LiPF_6$ at a concentration of 1 mole/liter in a 1:1 (weight ratio) mixed solvent of propylene carbonate and diethyl carbonate was used. The total lithium amount in the cell based on the negative electrode PAS was 1.040 mAh/g.

The resultant cell was charged at a constant current of 0.25 mA/cm² until the cell voltage became 4.3 V, and then, successively, the cell was discharged at a constant electric current of 0.25 mA/cm² until the cell voltage became 2.5 V. This 4.3 V–2.5 V cycle was repeated, and when in the third discharge, an evaluation was made using volume capacity (mAh/cc), it was 169 mAh/cc. As the volume standard, the total of the electrode volumes, the separator volume and the current collector volumes was used.

Comparative Example 13

A cell was assembled in the same manner as in Example 1 except that as to lithium originating in the negative electrode, a solution of $LiPF_6$ at a concentration of 1 mole/liter in a 1:1 (weight ratio) mixed solvent of propylene carbonate and diethyl carbonate was used, and an evaluation was made using volume capacity, which was found to be 155 mAh/cc.

EXAMPLE 13

A cell was assembled in the same manner as in Example 12 except that as to lithium originating in the negative electrode, a solution of $LiPF_6$ at a concentration of 1 mole/liter in a 1:1 (weight ratio) mixed solvent of propylene carbonate and diethyl carbonate was used, and an evaluation was made using volume capacity, which was found to be 167 mAh/cc.

The volume capacity in this example is about 10% higher than that in Comparative example 13.

We claim:

1. An organic electrolytic cell comprising a positive electrode, a negative electrode and a solution of lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g, based on the infusible, insoluble substrate.

2. The organic electrolytic cell according to claim 1, wherein the negative electrode additionally comprises a binder of a fluorine-containing polymer having a fluorine/carbon atomic ratio of under 1.5 but is at least 0.75.

3. The organic electrolytic cell according to claim 2, wherein the fluorine-containing polymer is polyvinylidene fluoride.

4. The organic electrolytic cell according to claim 1, wherein a lithium-containing metallic oxide is used as the positive electrode.

5. An organic electrolytic cell comprising a positive electrode, a negative electrode and a solution of a lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g, based on the infusible, insoluble substrate, the infusible, insoluble substrate being such that the amount of adsorbed gas at a nitrogen adsorption thickness of 10 obtained from a nitrogen adsorption isotherm is no more than 100 cc/g.

6. The organic electrolytic cell according to claim 5, wherein the negative electrode additionally comprises a binder, the binder being a fluorine-containing polymer having a fluorine/carbon atomic ratio of under 1.5 but is at least 0.75.

7. The organic electrolytic cell according to claim 6, wherein the fluorine-containing polymer is a polyvinylidene fluoride.

8. The organic electrolytic cell according to claim 5, wherein the positive electrode is a lithium-containing metallic oxide.

9. An organic electrolytic cell comprising a positive electrode, a negative electrode and a solution of a lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g, based on the infusible, insoluble substrate, the infusible, insoluble substrate being composed of particles having an average particle size of no more than 20 μm.

10. An organic electrolytic cell comprising a positive electrode, a negative electrode and a solution of a lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g, based on the infusible, insoluble substrate, the negative electrode being obtained by forming the infusible, insoluble substrate on a metallic foil using a thermoplastic binder to make a resultant form, and then heating the resultant form at a temperature at least equal to the melting point of the thermoplastic binder.

11. An organic electrolytic cell comprising a positive electrode, a negative electrode and a solution of a lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g based on the infusible, insoluble substrate, the lithium in the negative electrode being previously carried on the infusible, insoluble substrate prior to assembly of the cell.

12. An organic electrolytic cell comprising a positive electrode, a negative electrode and a solution of a lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g, based on the infusible, insoluble substrate, the lithium originating in the negative electrode being electrochemically carried through the application of an electric potential no greater than the electric potential of metallic Li.

13. An organic electrolytic cell comprising a positive electrode, a negative electrode and a solution of a lithium salt in an aprotic organic solvent as an electrolytic solution, wherein (1) the positive electrode contains a metallic oxide, (2) the negative electrode comprises an infusible, insoluble substrate having a polyacene skeletal structure and a hydrogen/carbon atomic ratio of 0.5 to 0.05, said substrate being a heat-treated product of an aromatic condensation polymer, and (3) the total amount of lithium contained in the cell corresponds to a charge and discharge capacity of at least 500 mAh/g, and the amount of lithium originating in the negative electrode corresponds to a charge and discharge capacity of at least 100 mAh/g, based on the infusible, insoluble substrate, the lithium originating in the negative electrode being electrochemically carried through the use of a solution of a lithium salt in a cyclic carbonate solvent.

* * * * *

UNITED STATES PATENT AND TRADEMARK OFFICE
CERTIFICATE OF CORRECTION

PATENT NO. : 5,750,287
DATED : May 12, 1998
INVENTOR(S) : Hajime KINOSHITA et al It is certified that error appears in the above-indentified patent and that said Letters Patent is hereby corrected as shown below:

Column 29, line 12; change "thickness of 10 obtained"
to ---thickness of 10Å obtained---.

Signed and Sealed this

Twenty-seventh Day of October, 1998

Attest:

BRUCE LEHMAN

Attesting Officer      Commissioner of Patents and Trademarks